（12）United States Patent
Albert

(10) Patent No.: US 8,784,524 B2
(45) Date of Patent: Jul. 22, 2014

(54) DUCT VENT FILTER COVER

(75) Inventor: James Albert, Naples, FL (US)

(73) Assignee: James Albert, Naples, FL (US)

( * ) Notice: Subject to any disclaimer, the term of this patent is extended or adjusted under 35 U.S.C. 154(b) by 150 days.

(21) Appl. No.: 13/398,137

(22) Filed: Feb. 16, 2012

(65) Prior Publication Data
US 2013/0212990 A1    Aug. 22, 2013

(51) Int. Cl.
*B01D 59/00*    (2006.01)

(52) U.S. Cl.
USPC ............ 55/373; 55/378; 55/380; 55/385.2; 55/429; 55/478; 96/136; 96/139; 96/224; 96/415; 96/421

(58) Field of Classification Search
CPC ....... A47L 9/1427; A47L 5/362; A47L 5/365; A68B 19/00
USPC ......... 55/385.2, DIG. 35, 373, 380, 378, 274, 55/478, 429, 481, 495, 506; 484/289, 370; 96/136, 139, 224, 415, 421
See application file for complete search history.

(56) References Cited

U.S. PATENT DOCUMENTS

| | | | |
|---|---|---|---|
| 3,261,148 A * | 7/1966 | Wurtenberg | 55/341.4 |
| 3,327,458 A | 6/1967 | Auckland | |
| 5,597,392 A * | 1/1997 | Hawkins et al. | 96/222 |
| 5,947,815 A | 9/1999 | Danforth | |
| 6,171,354 B1 | 1/2001 | Johnson | |
| 6,461,235 B2 * | 10/2002 | Rutler et al. | 454/289 |
| 2008/0160903 A1* | 7/2008 | Fontana | 454/289 |
| 2009/0078121 A1 | 3/2009 | Hepburn | |

* cited by examiner

*Primary Examiner* — Robert Clemente
*Assistant Examiner* — Karla Hawkins
(74) *Attorney, Agent, or Firm* — Hahn Loeser & Parks LLP; Shannon V. McCue

(57) ABSTRACT

A duct filter bag used in connection with a heating and air conditioning vent, the duct filter bag including a filter body constructed of a material that is air permeable yet catches particles exiting the vent, the filter body having a perimeter; an attachment assembly connected to the filter body; where the filter body is extendable outward relative to the attachment assembly to define a filter volume; the attachment assembly being adapted to attach the filter body such that the filter volume is in registry with the vent.

20 Claims, 4 Drawing Sheets

DUCT VENT FILTER COVER

TECHNICAL FIELD

In general, the invention relates to the field of building construction supplies, and more particularly to a temporary duct filter bag that encompasses the exterior of a vent to catch debris and other particulates expelled from the vent during construction.

BACKGROUND OF THE INVENTION

Today most indoor spaces in homes and offices are cooled by central air conditioning systems that pull air from each room, through ducts, and to an HVAC handler unit. In the HVAC handler unit, the air is cooled by passing it over coils that are filled with a refrigerant. After cooling, the air is forced through supply ducts leading to supply vents within each room of the interior space. The cool air exits the supply vents and fills the interior living space in order to maintain a desired temperature level. When the air is pulled from the indoor living spaces and through the return ducts, the air is directed through one or more filters that trap some, dirt and germs before the returning air reaches the HVAC handler unit. The primary purpose of these filters is not to keep the air clean in the indoor living environment. Instead, these filters are meant to remove dust and dirt before the air reaches the evaporator coil and blower of the HVAC handler units so that the coils stay clean for efficient heat transfer. Over time, the ducts and/or equipment need to be replaced because of decay, deterioration, mold, asbestos, equipment failure or re-sizing.

Accordingly, when the old ducts or equipment are removed and the new ducts or equipment installed, there remains a need for a filter that is specifically adapted for placement on the outside and over the air supply vents of an air conditioning system in order to remove dirt, soot, fiberglass, mold, asbestos, debris, and other particles or contaminants from falling out or from the cool airflow forcing it to enter the indoor living environment. For simplicity, the various particles and contaminants will be collectively referred to as particles below.

SUMMARY OF THE INVENTION

The present invention generally includes a duct filter bag that temporarily covers a supply air duct or vent that provides air to an indoor space. The duct filter bag includes a filter body and an attachment assembly, where the filter body defines a filter volume about the vent into which particles expelled from the vent are captured before entering the conditioned space.

The present invention further includes a duct filter bag used in connection with a heating and air conditioning vent, the duct filter bag including a filter body constructed of a material that is air permeable yet catches particles exiting the vent, the filter body having a perimeter; an attachment assembly connected to the filter body; where the filter body is extendable outward relative to the attachment assembly to define a filter volume; the attachment assembly being adapted to attach the filter body such that the filter volume is in registry with the vent The present invention also provides a method of providing a temporary filter for an HVAC vent, a method including providing a filter body constructed of a material that is breathable yet capable of catching particles existing the vent; applying an attachment assembly to a perimeter of the filter body; and fastening the attachment assembly to place the filter body in registry with the vent.

BRIEF DESCRIPTION OF THE DRAWINGS

For a further understanding of the nature of the present invention, reference should be made to the following detailed description in conjunction with the accompanying drawings.

DETAILED DESCRIPTION OF THE INVENTION

Figure 1:
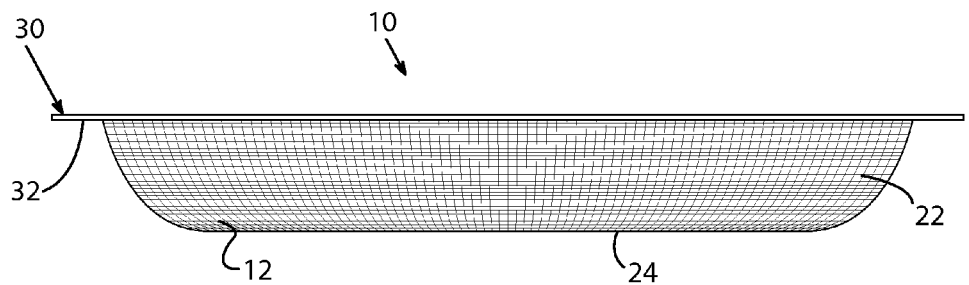
FIG. 1 is a side elevational view of a duct filter bag according to the concepts of the present invention.

A duct filter bag according to the concepts of the invention is generally indicated by the number 10 in the drawings. Duct filter bag 10 is temporarily placed over a vent V, which may be a ceiling mounted supply vent as shown, to catch particles or contaminants exiting the vent V. The types of particles or contaminants that may be exiting the vent V vary depending on the heating, ventilation, and cooling (HVAC) system being repaired or installed/repaired, environmental conditions, and on the nature of the space. For example, when replacing or repairing older systems, a buildup of dust, dander, hair, soot, asbestos, and mold may be found in the ductwork of the HVAC system and expelled from the vent V during repair. Larger particles including construction debris, paint chips, wood splinters or fiberglass may also be present. It is also contemplated that smaller particles or contaminants including chemical fumes may be expelled from the vent V. The above examples should not be considered limiting. For sake of simplicity, all particles and contaminants to be filtered by the duct filter bag 10 will collectively be referred to as particles. Depending on the type of particles to be filtered, the level of filtration may be altered as described more completely below.

Duct filter bag 10 includes a filter body 12, which may be constructed of any suitable material that allows at least some air flowing from a vent V to escape while catching particles exiting the vent V. The amount of air flow permitted may vary depending on the application and the types of particles to be filtered. In general, the smaller the particle to be filtered, the greater the restriction of the air flow. In some cases, maintaining air flow will be as important or more important than filtering smaller particles. For example, when filtering dust and construction debris, it has been found that adequate air flow for conditioning a space is maintained when using a filter fabric capable of 20-25 micron filtration and having a weight of 30-50 grams per square meter. This example is not, however, limiting as it is expected that other levels of filtration and fabric weights would also be suitable. For example, to filter fumes or mold, smaller micron material would be used. For example, a 0.3 micron HEPA filter would be suitable. Alternatively, if relatively large debris is expected or greater airflow is needed a material having pores greater than 25 microns may be used.

In general, filter body 12 is air permeable and may be constructed of any material and have any configuration that catches particles yet allows air to pass through. The filter body 12 may include a screen or mesh formed of any suitable material, or, it may be formed of a breathable fabric (FIG. 4), that is air permeable or has pores allowing air to pass. The examples shown in FIGS. 1-5 and 5 schematically show filter body 12 as having a screen or mesh-like structure, but it will be understood that filter body 12 may have other configurations. For example filter fabrics (FIG. 4) often have amorphous openings or pores 17 that do not follow a regular pattern. To that end, the figures should not be considered limiting.

The proportions of the duct filter bag 10 may vary depending on the size of the vent V. In general, duct filter hag 10 is sized and configured to fit over the entire opening of vent V so that duct filter bag 10 confronts the airflow exiting the vent V. In the example shown, duct filter bag 10 has a rectangular configuration to allow it to conform to a rectangular vent V. Any other shape may be used, and thus, the shape shown in the drawings should not be considered limiting.

As shown, filter body 12 may be configured to define a filter volume 20 adjacent to vent V. As shown in the depicted example, the filter volume 20 may be formed by configuring filter body 12 to have a bag-like shape. This configuration may be achieved by providing filter body with one or more sidewalls 22 extending outward from vent V and a base or bottom wall 24 that extends inward from the sidewall 22. Bottom wall 24 may lie generally normal to the air flow exiting the vent V. The sidewall 22 and bottom wall 24 may be formed from a single sheet or layer of filter material that is folded to achieve the desired shape. Alternatively, the sidewall 22 and bottom wall 24 may be formed by over-sizing the filter body 12 relative to the vent V and attaching it to the perimeter of the vent V such that the air flow causes the oversized material to billow outward from the vent V to form the filter volume 20, as in the depicted example shown in FIGS. 1-3.

Filter volume 20 projects outward relative to vent V to collect particles exiting the vent V. This outward projection of the filter volume 20 improves upon existing filters located directly adjacent or within the vent V that tend to clog faster or retain the particles within the vent V. The filter volume 20 may collect particles to the point that the filter volume 20 is filled or the pores 17 of the filter body 12 clogged. Once this point is reached, the duct filter bag 10 can be removed and the entire duct filter bag 10 or simply the collected particles within the duct filter bag 10 may be discarded.

An attachment assembly, generally indicated by the number 30, is provided to attach filter body 12 so that it is in registry with vent V. Such that air exiting vent V must pass through filter bag 10. Attachment assembly 30 may attach to the vent V or an area of the structure S surrounding the vent V. Attachment assembly may include a fastener including but not limited to Velcro, an adhesive or an elastic band, or adhesive tape to attach duct vent bag 10, as described more completely below. To avoid particles escaping from around filter body 12, attachment assembly may also act as a seal between the filter body 12 and the vent V or surrounding structure S. Alternatively, a separate seal may be provided to be used in connection with attachment assembly.

Figure 2:
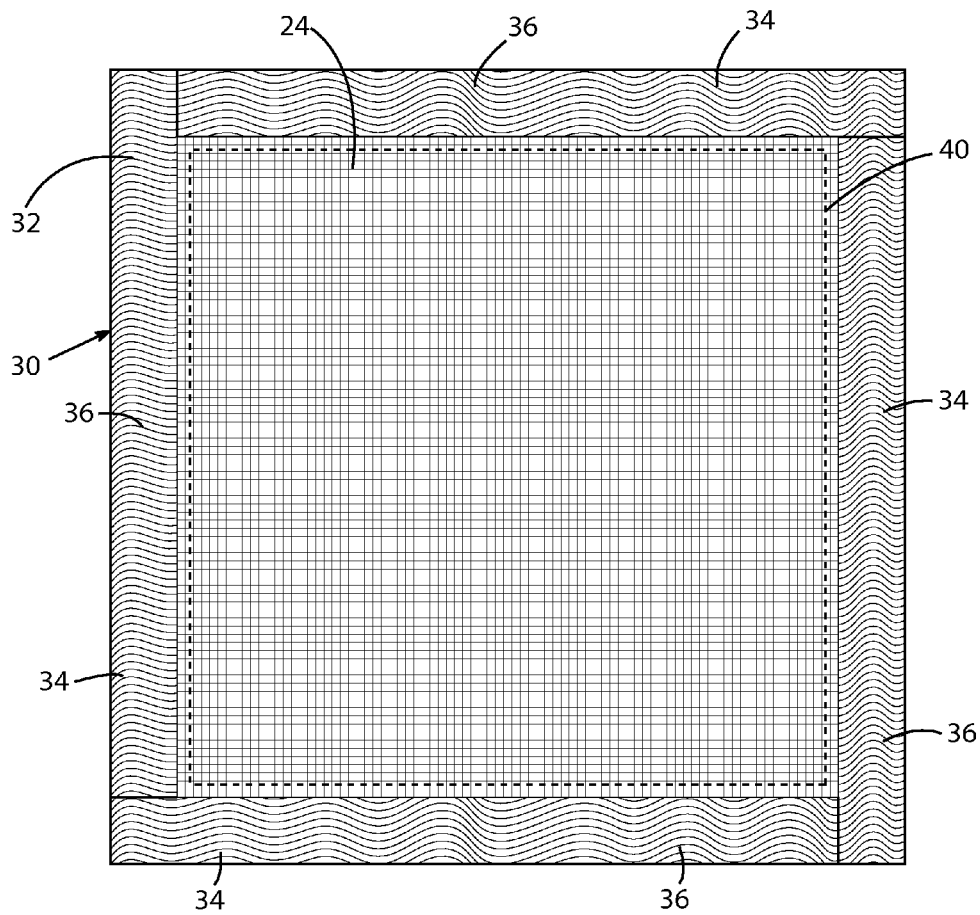
FIG. 2 is a top plan view thereof.

In the example shown in FIGS. 1 and 2, attachment assembly includes a frame 32. Frame 32 may be a solid frame that attaches to filter body 12, or, as shown, frame 32 may be constructed of a flexible material. In FIGS. 1 and 2, frame 32 is constructed of strips of tape 34 that have an adhesive on a single side 36. The tape 34 is, therefore, arranged so that a portion of the adhesive side 36 overlies a perimeter 40 of filter body 12 and extends outward of the perimeter 40 of filter body 12 to attach to vent V or a surrounding structure S. Alternatively, frame 32 may be constructed of double sided tape with a first adhesive side attached to the filter body 12 and a second adhesive side attached to the vent V or a surrounding structure S. In either example, to facilitate handling and packaging of the duct filter bags 10, a release layer may be provided to cover the exposed adhesive side 36. Before installing, the release layer would be removed by the user and the duct filter bag 10 attached by adhering the exposed portion of adhesive side 36 to the vent V or a surrounding structure S.

Figure 4:
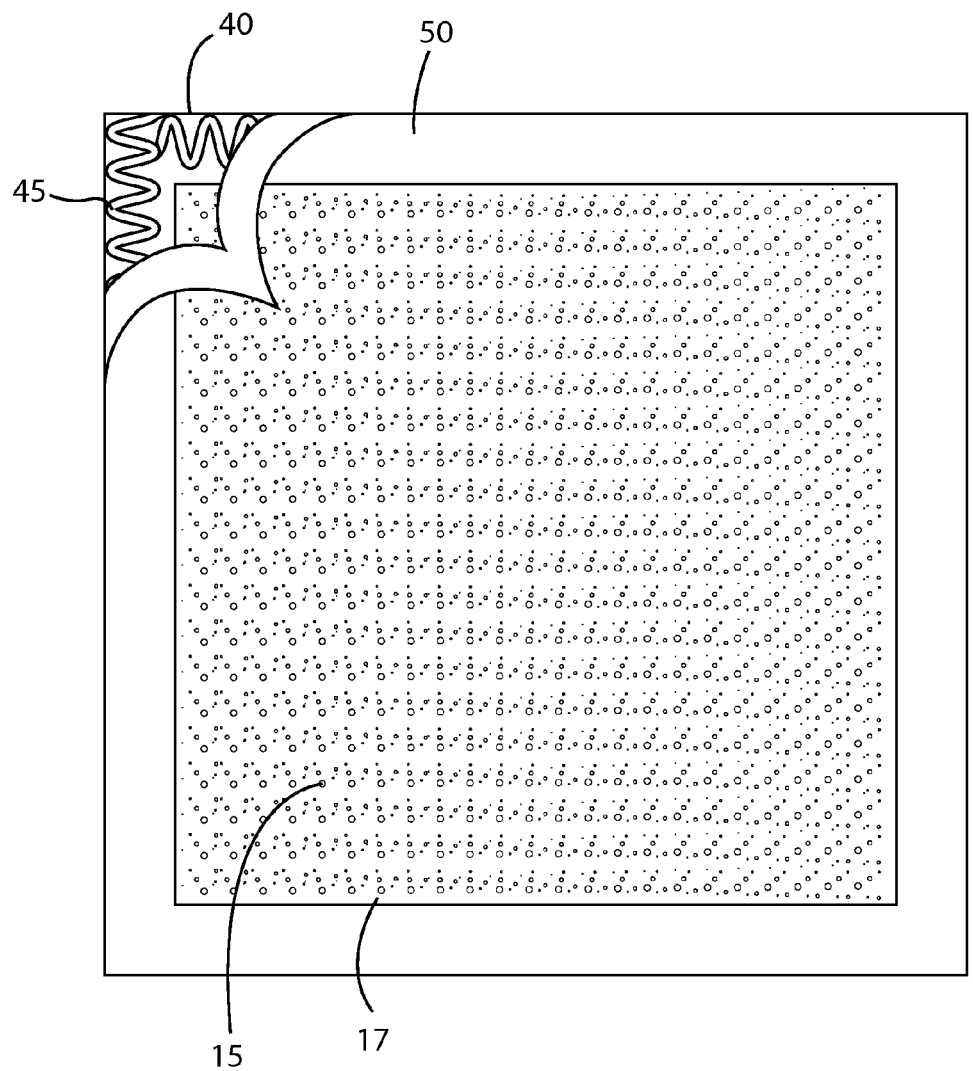
FIG. 4 is a top plan view similar to FIG. 2 of an alternative embodiment of a duct filter bag according to the concepts of the present invention.

FIG. 4 shows an alternative embodiment of the present invention. In particular, FIG. 4 schematically shows a duct filter bag 10 having a filter body 12 constructed of a porous fabric 15. It will be appreciated that the pores 17 schematically represented in FIG. 4 may have any shape and be of any size that permits air to pass through the filter body 12 while filtering particles based on the needs of the application. The pores 17 are enlarged for purposes of illustration only. Likewise, pores 17 need not have the circular shape shown and may have other shapes including randomly shaped pores formed through a fiber of the filter fabric.

As shown in FIG. 4, attachment assembly 30 may include an adhesive 45 applied directly to the filter body 12. In the example shown, adhesive 45 is applied at the perimeter 40 of filter body 12. Adhesive 45 may be any adhesive suitable for attaching filter body 12 about the vent V. Depending on the type of adhesive 45, a release layer 50 may be provided to cover adhesive 45 until the user is ready to install the duct filter bag 10. As shown, release layer 50 may be peeled away to expose adhesive 45, and the duct filter bag 10 installed as described with reference to FIGS. 3A-3C below. Alternatively, adhesive 45 may be a contact adhesive that requires pressure to bond the adhesive 45 to a structure. In this example, a release layer 50 may be omitted. To install the duct filter bag, the method shown in FIGS. 3A-3C below would be used with the additional step of applying sufficient pressure to form an adhesive bond between the margins of the duct filter bag 10 and the surface to which it is attached.

Figure 3A:
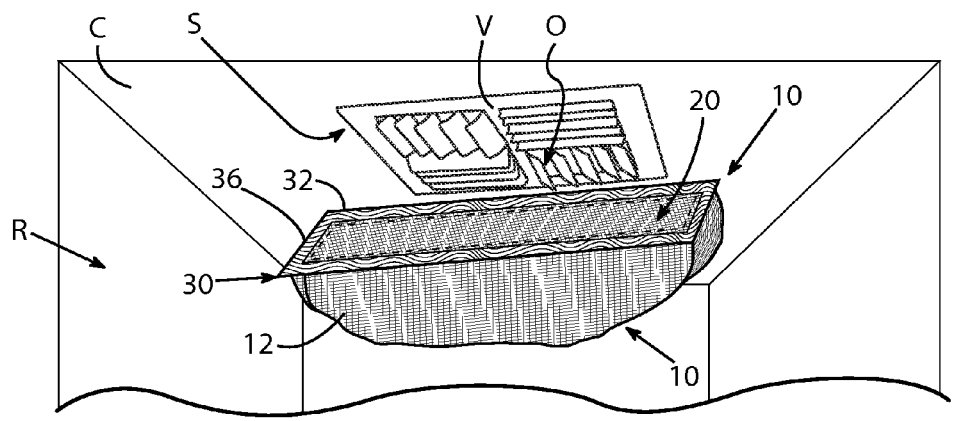
FIGS. 3A-3C are a series of perspective views showing installation of a duct filter bag according to the concepts of the present invention over a supply vent.
Figure 3B:
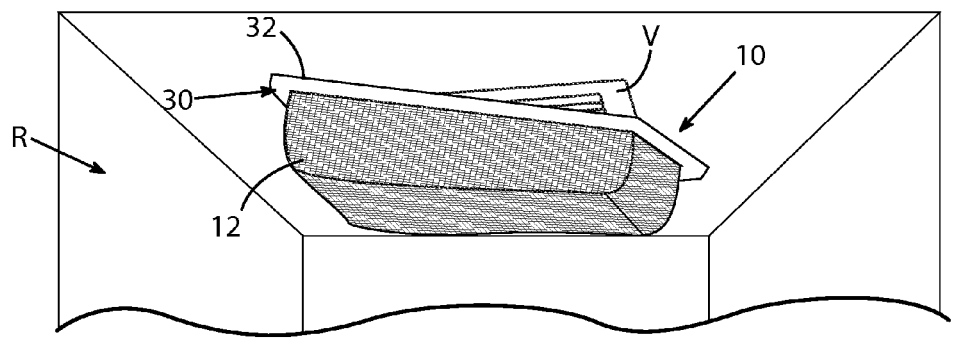
Figure 3C:
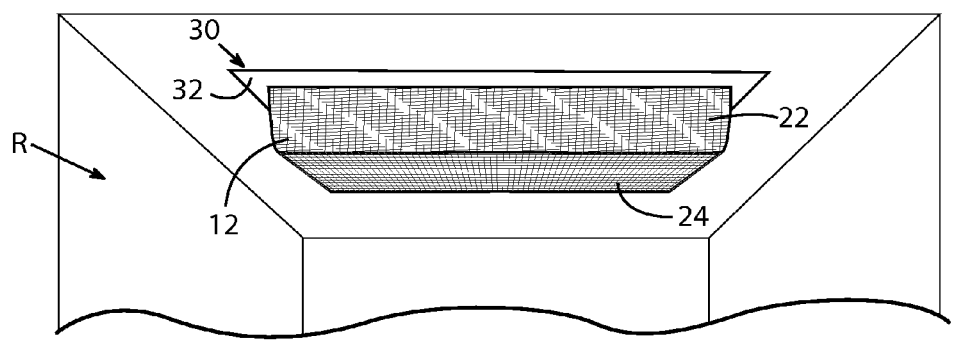

FIGS. 3A-3C show an example of a method of installing a duct filter bag 10 according to the invention about a vent V. In the example shown, the vent V is located in the ceiling C of a ventilated space or room R. It will be appreciated that vent V may be located at other locations within the structure, and the duct filter bag 10 applied in the manner described below without departing from the spirit or scope of the invention. As shown in FIG. 3A, the duct filter bag 10 is positioned to encompass the vent V and in particular any openings O within vent V. Attachment assembly 30 is used to attach duct filter bag 10 to vent V or, as shown, the surrounding structure S. In the example shown, attachment assembly includes a frame 32 constructed of tape 34. The frame of tape 34 may be applied prior to positioning the duct vent bag 10 relative to vent V, or filter body 12 may be positioned about vent V and the tape 34 applied to form frame 32 in place.

FIG. 3B shows a duct filter bag 10 with frame 32 already in place. The exposed adhesive side 36 of frame 32 is then pressed against structure S to attach duct filter bag 10 and concurrently seal perimeter 40 of duct filter bag 10 around vent V, as best seen in FIG. 3C.

Figure 5:
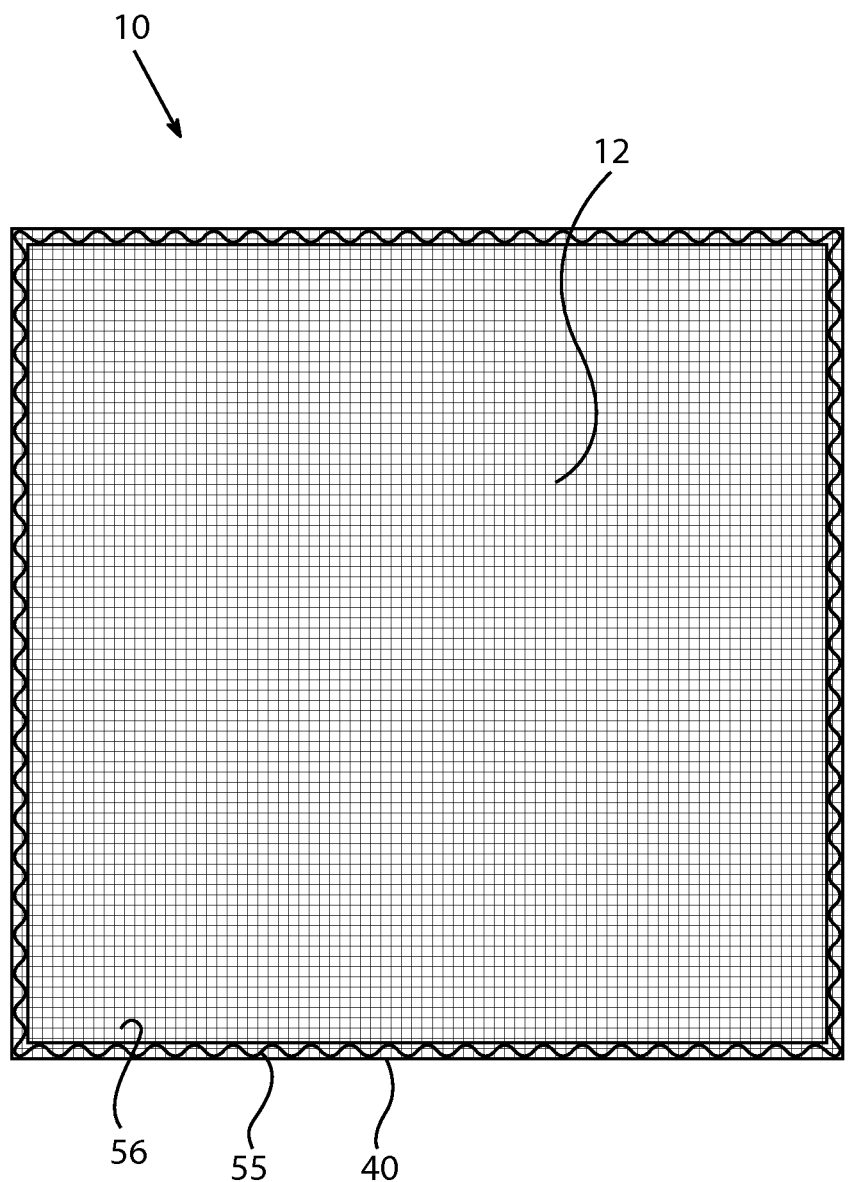
FIG. 5 is a top plan view similar to FIG. 2 of another alternative embodiment of a duct filter bag according to the concepts of the present invention.

As shown in FIG. 5, attachment assembly 30 may be an elastic member, such as a band 55. Elastic band 55 may be attached to the perimeter 40 of duct filter bag 10 in any known manner. In the example shown, elastic band 55 is bonded to the perimeter 40 of duct filter bag 10. The opening 56 defined by elastic band 55 is generally smaller than the vent V or other protruding portion of the duct to which the duct filter bag 10 is to be attached. In this way, the perimeter 40 of duct filter bag 10 is stretched against the force of the elastic band to fit duct filter bag 10 over vent V to grasp the vent V or a surrounding surfaces to hold duct filter bag 10 in registry with vent V.

While the opening 56 formed by the perimeter 40 of duct filter bag 10 shown in FIG. 5 is generally rectangular in shape, any shape may be used, including other polygon shapes or irregular shapes defined by the elastic material forming the band 55.

In accordance with the patent laws, the applicant's preferred embodiment and best mode have been described in the accompanying drawings and detailed description. The embodiments described and shown, however, should not be considered limiting as other embodiments will fall within the scope of the invention as defined by the appended claims.

The invention claimed is:

1. A duct filter bag used in connection with a heating and air conditioning vent, the duct filter bag comprising:
    a flexible filter body constructed of an air permeable material that catches particles exiting the vent, the flexible filter body having a filter volume, the flexible filter body configured to deform to increase the filter volume based on caught particles, the flexible filter body disposed outside the vent toward a room in fluid communication with the vent;
    an attachment assembly connected to the filter body, wherein the flexible filter body extends outward from the vent relative to the attachment assembly to define the filter volume, the attachment assembly being adapted to directly attach the flexible filter body to a vent cover or wall parallel to the vent cover such that the filter volume is in registry with the vent.

2. The duct filter bag of claim 1, wherein the vent is a ceiling or wall vent, wherein the attachment assembly includes a frame comprised of one or more adhesive strips configured to have sufficient adhesive strength to secure the duct filter bag about the ceiling or wall vent, wherein the adhesive strips have an attachment surface, and wherein a portion of the attachment surface overlies a perimeter of the flexible filter body and a second portion of the attachment surface is exposed to secure the flexible filter body about the vent.

3. The duct filter bag of claim 1, wherein the flexible filter body defines an area larger than an area of the vent.

4. The duct filter bag of claim 1, wherein the flexible filter body includes a sidewall constructed of the air permeable material extending outward from the attachment assembly and a bottom wall extending inward from the sidewall to define the filter volume, wherein the sidewall is continuous with the air permeable material of the bottom wall such that the sidewall and bottom wall are formed as a unitary structure of the air permeable material.

5. The duct filter bag of claim 1, wherein the vent is a ceiling or a wall vent, wherein the attachment assembly includes a layer of contact adhesive applied near a perimeter of the filter body, the contact adhesive configured to have sufficient adhesive strength to secure the duct filter bag about the ceiling or wall vent.

6. The duct filter bag of claim 1, wherein the attachment assembly includes a frame attached to a perimeter of the filter body, wherein the frame encompasses the perimeter and extends outward therefrom to form an attachment surface, wherein the attachment surface carries a fastener adapted to secure the frame about the vent.

7. The duct filter bag of claim 6, wherein the vent is a ceiling or a wall vent, and wherein the fastener is an adhesive having sufficient adhesive strength to secure the duct filter bag, about the ceiling or wall vent.

8. The duct filter bag of claim 1, wherein the attachment assembly directly attaches to the vent cover and includes an elastic band attached about a perimeter of the filter body, wherein the elastic band defines an opening, that is selectively expanded to receive a portion of the vent and redacted to hold the filter body about a side of the vent external to the vent.

9. The duct filter bag of claim 1, wherein the vent is a ceiling or a wall vent, wherein the filter body is rectangular in shape, and the attachment assembly includes a strip of adhesive tape applied to each edge of the rectangular shape, wherein a portion of the adhesive tape extends outward of each edge of the filter body and is adapted to secure the filter body about the vent, and wherein the adhesive tape is configured to have sufficient adhesive strength to secure the duct filter bag about the ceiling or wall vent.

10. The duct filter bag of claim 1, wherein the filter body is constructed of a collapsible mesh bag.

11. The duct filter bag of claim 1, wherein the filter body is constructed of a fabric defining one or more pores through which air can escape.

12. A method of providing a temporary filter for an HVAC vent, a method comprising:
    providing a flexible duct filter bag having a filter body constructed of a breathable material capable of catching particles travelling out of the vent, wherein the flexible duct filter bag has a volume that is expandable based on collection of the particles;
    providing an attachment assembly about a perimeter of the filter body; and
    fastening the attachment assembly directly to a vent cover or wall parallel to the vent cover to place the filter body in registry with the vent and disposed outside the vent toward a room in fluid communication with the vent.

13. The method of claim 12, wherein the vent is a ceiling or a wall vent, wherein a step of providing an attachment assembly includes applying tape to the perimeter of the filter body to form a frame, wherein a portion of the tape extends outwardly of the perimeter to provide a surface to be adhered about the vent, and wherein the tape is configured to have sufficient adhesive strength to secure the duct filter bag about the ceiling or wall vent.

14. The method of claim 12, wherein the vent is a ceiling or a wall vent, wherein the step of providing an attachment assembly includes applying an adhesive about the perimeter of the filter body, and wherein the adhesive is configured to have sufficient adhesive strength to secure the duct filter bag about the ceiling or wall vent.

15. The method of claim 14 further comprising the step of removing a release layer prior to attaching the adhesive to secure the filter body about the vent.

16. The method of claim 12, wherein providing an attachment assembly includes providing an elastic member about the perimeter of the filter body, and wherein fastening the attachment assembly includes expanding the elastic member to define an opening to receive at least a portion of the vent cover and retracting the elastic member to hold the filter body about a side of the vent cover external to the vent.

17. The duct filter bag of claim 1, wherein the air permeable material of the filter body is elastic.

18. The duct filter bag of claim 1, wherein the vent is one of a ceiling vent or a wall vent at a height such that no portion of the flexible filter body is in contact with a floor.

19. The method of claim 12, further comprising removing the duct filter bag after particles have been collected within the duct filter bag.

20. The method of claim 19, further comprising sealing the removed duct filter bag by folding the duct filter bag closed such that at least two portions of the attachment assembly mate to prevent spilling of the particles.

* * * * *